S. S. Campbell,
Grinding and Polishing Saws.
Nº 23,228.            Patented Mar. 15, 1859.
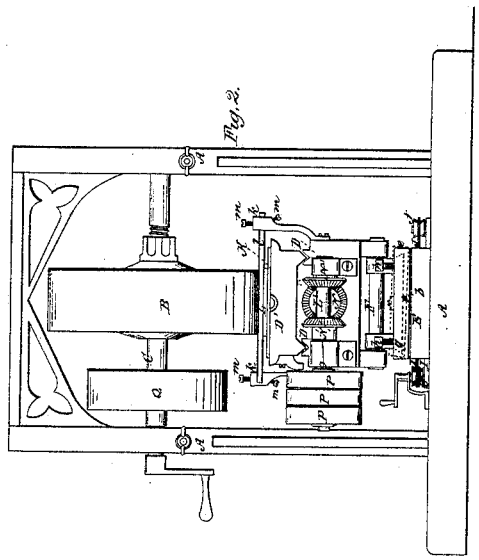
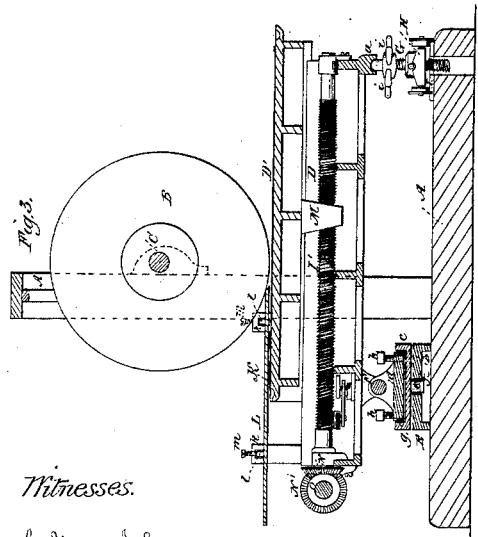
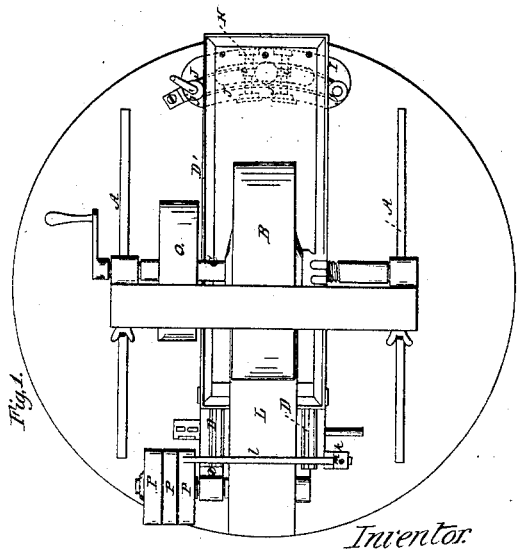
Witnesses.
Inventor.

UNITED STATES PATENT OFFICE.

SAML. S. CAMPBELL, OF MONTREAL, CANADA.

MACHINE FOR GRINDING AND POLISHING SAWS.

Specification of Letters Patent No. 23,228, dated March 15, 1859.

*To all whom it may concern:*

Be it known that I, SAMUEL S. CAMPBELL, of Montreal, in the district of Montreal and Province of Canada, have invented a new and useful Improvement in Machines for Grinding and Polishing Saws; and I do hereby declare that the following is a full, clear, and exact description of the same, reference being had to the accompanying drawings, forming a part of this specification, in which—

Figure 1, is a plan or top view of a saw grinding machine constructed with my improvements. Fig. 2, is an end view of the same. Fig. 3, is a vertical longitudinal section.

Similar letters of reference, in each of the several figures indicate corresponding parts.

The nature of my invention consists, 1st., in so arranging the longitudinal carriage ways on supports that they with the carriage, and all attachments may be inclined laterally so as to stand obliquely to the horizon or the circumference of the lap or grinding stone.

My invention consists, 2nd, in arranging one of the supports of the machine on a pivot and the other on a truck which reciprocates on a circular railway, so that the carriage ways and carriage with all attachments thereof may be adjusted in the path of a circle so as to stand oblique to the shaft of the lap or grindstone.

My invention consists, 3rd, in providing the longitudinal reciprocating carriage with a stationary stop and a capping or holding down plate which is adjustable up and down, but stationary longitudinally.

By the first feature of my invention, the use of a bed plate, arranged on top of the carriage, so as to be adjusted obliquely to the horizon or circumference of the lap or grind stone when it is desired to grind saw blades which are of taper form in their transverse section, is avoided and thus the inconveniences and inaccuracies experienced from the said bed plate springing or changing its shape, overcome.

By the second feature of my invention, the carriage ways and carriage and all the attachments thereof can be reciprocated laterally at intervals in the path of a circle, so as to avoid irregular wearing of the circumference of the stone, and so as to have the impressions or lines made by the lap or grind stone run at right angles to the ends of the blade instead of diagonal thereto, and thus produce a better finish and avoid impairing the strength of the saw blade by grinding it across its grain. It is very essential to have the parts arranged to turn on a center and to be moved by a traveling truck arrangement, as this allows of the whole machine having the requisite adjustments, notwithstanding its great weight, given to it very conveniently and readily with the application of slight power.

By the third feature of my invention, a stop for the end of the saw blade to rest against, as the longitudinally reciprocating carriage traverses, is provided and facilities for grinding all thicknesses of blades afforded, and the blade while being ground is held permanently down to the top of the carriage in a manner to avoid springing up of the end of the same shortly after it passes beyond the axis of the lap or grind stone.

To enable others, skilled in the art, to make and use my invention, I will proceed to describe its construction and operation.

A, represents the frame which supports an ordinary lap or grindstone B, which is made fast on a horizontal shaft C, and revolved in the path of a vertical circle with the same.

D, D, are the carriage ways and D', the carriage arranged on top of the same. The ways are connected together laterally and hung at one end to a pillow block E, by a pivot F, and connected at the other end to a vertical support G, by a ball and socket joint *a*. The pillow block E, is composed of three parts *b*, *c*, *d*. The part *b*, is stationary and has the part *c*, connected to it by a pivot or axial pin *e*, which fits in an enlarged socket *f*, and serves as the horizontal fulcrum for the carriage ways to turn upon, the connection between the part *c*, and the part *d*, being effected by means of a dovetail *g*, on the part *d*, as shown in Fig. 2 in dotted lines. The part *d*, is furnished with four adjusting screws *h*, *h*, two on each side. By these screws, the parts *c*, *d*, and the carriage ways can be adjusted laterally either right or left to a position oblique to the horizon or the circumference of the lap or grind stone. It is by thus adjusting the carriage ways that the necessity of using a light bed piece on the reciprocating carriage for the saw to rest on is avoided and the disadvantages arising from a springing at the center of said thin bed piece avoided.

The support G, of the loose end of the carriage ways D, D, rests on a wheeled truck H, being fastened in a screw tapped socket formed in the center of the truck frame, by means of a screw thread on its lower end; said screw thread in combination with the tapped socket and windlass arms $i, i$, of the support serving as a means whereby to adjust the carriage ways and carriage with all attachments longitudinally on its pivot F, to a position oblique to the horizon so as to grind saw blades of varying thicknesses. The truck in which the support E, rests is arranged to travel or reciprocate on the rail way I, which forms part of a circle—its motion being imparted to it by means of an endless chain J, which passes around pulleys $j, j'$, and attaches by its ends to the back and front of the truck; the endless chain passes twice around the windlass pulley $j'$, so that it shall act with sufficient friction to cause the carriage to move back and forth. It is by thus having the carriage ways &c. arranged that the saw blade can be adjusted with the carriage ways and carriage so as to be ground in line with its grain by the lap or grind stone, and also that irregular wear of the stone is avoided and likewise that great ease and convenience in adjusting the machine for these purposes are secured.

K, is a stop on the front end of the longitudinally reciprocating carriage D, for the end of the saw blade to rest against, as shown in red. L, is a capping plate for holding down the saw. This plate is adjustable up and down to suit varying thicknesses of saws, by means of slotted standards $k, k$, transverse bars $l, l$, and set screws $m, m$, in the manner illustrated in the drawings or otherwise, as may be found most convenient. By the stop and holding down plate, the saw will be kept in position while being ground, as it has no chance to move longitudinally or to spring upward.

The reciprocating carriage is propelled by means of a screw shaft $L'$, and nut M, as usual; said screw shaft being set in motion by means of bevel wheels N, $N'$, $N'$, the wheel N, being on the end of the screw shaft and those $N'$, $N'$, being on the pulley shaft O, which carries pulleys P, P, P, from which a belt passes to an ordinary counter or main shaft, not shown. The lap or grind stone is set in motion by a belt passing from the main driving shaft to a pulley Q, on the shaft of the lap or grind stone.

What I claim as my invention and desire to secure by Letters Patent, is—

1. The specified arrangement of the longitudinal carriage ways D, on supports E, G, so that they with the carriage $D^1$ and all attachments, may be inclined laterally, and caused to stand obliquely to the horizon or the circumference of the lap or grinding stone for the purposes set forth.

2. Arranging one of the supports of the machine on a pivot $e$, and the other on a truck, H, which reciprocates on a circular railway, so that the carriage ways and carriage with all attachments thereof may be adjusted in the path of a circle so as to stand oblique to the shaft of the lap or grindstone, substantially as and for the purposes set forth.

3. Providing the longitudinal reciprocating carriage with a stationary stop K and a capping or holding down plate L, which is adjustable up and down but stationary longitudinally, substantially as and the purposes set forth.

The above specification of my improvement in grinding and polishing saws, signed by me this 23rd day of December 1858.

S. S. CAMPBELL.

Witnesses:
G. YORKE ATLEE,
H. H. YOUNG.